United States Patent [19]

Kruk

[11] Patent Number: 4,798,482
[45] Date of Patent: Jan. 17, 1989

[54] DOUBLE-ROW ROLLER BEARING ASSEMBLY

[75] Inventor: Stanislaw Kruk, Vastra Frolunda, Sweden

[73] Assignee: SKF GmbH, Schweinfurt, Fed. Rep. of Germany

[21] Appl. No.: 65,788

[22] Filed: Jun. 24, 1987

[30] Foreign Application Priority Data

Jun. 26, 1986 [DE] Fed. Rep. of Germany ....... 3621381

[51] Int. Cl.⁴ .......................... F16C 33/36; F16C 43/04
[52] U.S. Cl. ..................................... 384/571; 384/559
[58] Field of Search ............... 384/548, 559, 561, 563, 384/569, 571, 584, 589, 499, 501, 502, 504, 510, 537

[56] References Cited

U.S. PATENT DOCUMENTS

| | | | |
|---|---|---|---|
| 1,505,352 | 8/1924 | Knowles | 384/501 |
| 2,142,946 | 1/1939 | Klamp | 384/571 |
| 2,142,958 | 1/1939 | Slusser | 384/571 |
| 2,447,928 | 8/1948 | Bergstrom | 384/571 |
| 3,606,502 | 9/1971 | deGermond | 384/501 |

FOREIGN PATENT DOCUMENTS

| | | | |
|---|---|---|---|
| 371438 | 4/1923 | Fed. Rep. of Germany . | |
| 2073332 | 10/1981 | United Kingdom | 384/548 |

Primary Examiner—Daniel P. Stodola
Assistant Examiner—Thomas R. Hannon
Attorney, Agent, or Firm—Eugene E. Renz

[57] ABSTRACT

The double-row bearing assembly with axially split inner and outer barrel rings has at least one pair of corresponding barrel rings and is connected by means of a fastening member in a form-locking manner. At least one spacer member is provided between a pair of corresponding barrel rings which are prevented from moving axially outward by the form-locking connection provided by the rolling elements. The spacer is provided with projections pointing in both axial directions, which cooperate with the associated barrel rings to provide a positive form-locking connection in the radial direction.

5 Claims, 1 Drawing Sheet

DOUBLE-ROW ROLLER BEARING ASSEMBLY

FIELD OF THE INVENTION

The present invention relates generally to roller bearing assemblies and more specifically, to improvements in a double-row ball bearing assembly.

BACKGROUND OF THE INVENTION

A roller bearing assembly generally of the type to which the present invention relates is shown in West German Pat. No. 371,438. The bearing assembly shown in this patent comprises a pair of so-called barrel rings, each having a raceway held together by annular fastening members on the lateral outer surface and in the bore. In the preferred arrangement shown in the German patent, an annular spacer member is provided between the adjacent side-by-side inner rings. By reason of this type of design, it is possible to manufacture the barrel rings separately, which is particularly advantageous in large-size bearing assemblies. Fastening and spacer members are necessary to form a roller bearing assembly ready for installation which provides additionally a compact unit for ease of transportation. In order to exploit these advantages, many accessory parts and the corresponding effort to assemble them are required in the presently known designs. Additionally, the two-part fastening sleeve which engages over the lateral surface represents an additional part subject to tolerances which must be produced with a high level of precision to ensure the necessary conditions for installation of the known roller bearing unit into a prefabricated seating bore. Additionally, the plural seating surfaces arrange successively in a radial direction in the lateral surface area present a situation which encourages defective installation or leads to changes in the accuracy of the seating during operation.

With the foregoing in mind, it is therefore an object of the present invention to provide a double-row ball bearing assembly which is assembled from separate rings whose peripheral surfaces, in the installed state, cooperate directly with corresponding seating surfaces to form a relatively compact unit which resists falling apart. To this end, the spacer member located between the barrel rings prevents the barrel rings from moving axially outwardly by reason of a form-locking connection provided by the rolling elements. Specifically, the spacer member has projections on both sides which cooperate with the associated barrel rings and the fastening member is provided on the other corresponding barrel ring. The roller bearing assembly of the present invention consists broadly of separately manufactured barrel rings which are maintained in assembled relation by at least one annular fastening member and an annular spacer member to form a double-row design. The fastening member holds together one pair of cooperating barrel rings and the spacer is located between the other pair of corresponding barrel rings. This division forms the optimum roller bearing arrangement according to the present invention which provides the fundamental solution to the problems of the prior art noted above. The principle of the present invention can be utilitized in other types of roller bearing arrangements simply by utilizing additional fastening members and additional spacers. Moreover, the beneficial effects provided by the present invention are applicable to other types of bearings such as double-row, purely radial load-bearing designs with ball or roller bearings or to angular contact bearings in an X or O configuration. The spacer for a bearing design in accordance with the present invention is adapted to be mounted between the barrel rings which, because of the positive locking connection by way of the raceways and the rolling elements, cannot move axially outwardly. In a roller bearing assembly designed for radial load exclusively, these are, for example, the outer barrel rings, provided that they have axially inwardly facing shoulders or flanges. In roller bearing assemblies of the O-configuration, these are again the outer barrel rings, whereas in the X-configuation, the spacer is provided between the inner rings. It is noted, however, that in all of the various modifications and alternatives discussed above, the principle is the same; that is, the barrel rings with no freedom of outward axial movement are provided with a spacer and rings free to move axially outwardly are provided with the fastening member.

Considering now the specific features and details of the present invention, the fastening member can be located in the area of the bore or lateral surface of the roller bearing assembly depending on which of the bearing configurations mentioned above is being utilized. Annular recesses are provided to keep the fastening member away from the seating surface. The spacer may be provided with axial projections which complement and cooperate with the rounded edges of the barrel rings to fix the same in a radial direction. In the foregoing, it can be seen that the present invention requires two relatively simple and easily manufactured components which, with the separately manufactured barrel rings and rolling elements, forms a double-row roller bearing assembly which is retained integral as a unit and cannot fall apart.

Other more specific features of the present invention include the provision of a one-piece spacer element of T-shaped profile which define profile sections projecting on both sides into the bearing spaces.

The present invention also contemplates alternative designs for the spacer and the means for securing it in radially form-locking installation between the rings. These spacer designs include axial projections or the like extending on both sides into the bearing space which rest preferably against the associated peripheral surface of the barrel rings. In this manner, the spacer and the barrel rings are fixed radially in a form-locking manner, the former with respect to the barrel rings and the barrel rings with respect to each other. More specifically, in accordance with one embodiment of spacer, the spacer is made of a single unitary piece and has a T-shaped profile defining profile sections projecting on both sides into the bearing spaces. Alternatively, the spacer may be provided with a rectangular profile with at least three axial holes distributed around the periphery for pins which project out on both sides into the bearing space. Further, the rectangularly profiled spacer may include on the associated peripheral surface a frictionally connected sleeve, the edges of which project on both sides into the bearing spaces. The edges of this sleeve can be bent over to form flanges which rest against the end surfaces of the spacer.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
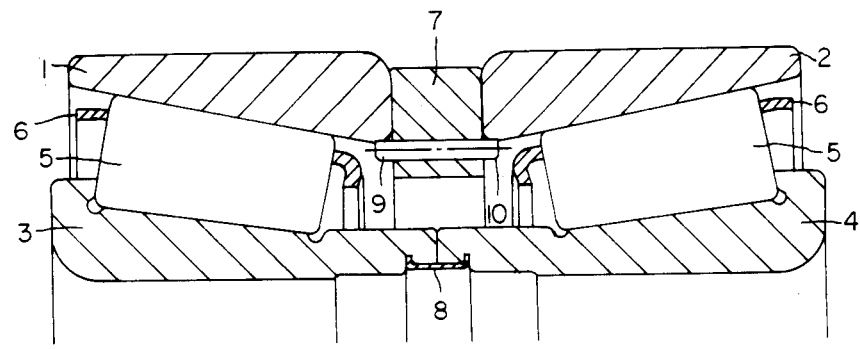
FIG. 1 is a partial longitudinal sectional view taken through a double-row rolling bearing assembly which in the present instance is an O-configuration utilizing a rectangular profile spacer and retaining pins.
Figure 2:
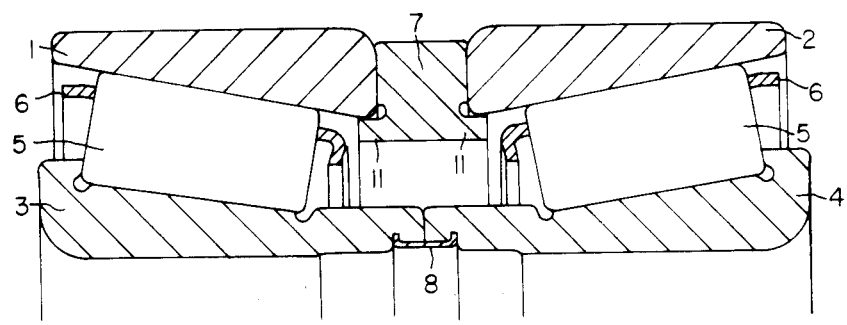
FIG. 2 is a view similar to FIG. 1 showing a roller bearing assembly utilizing a spacer member of T-shaped profile.

Referring now to the drawings and particularly to FIG. 1 thereof, there is illustrated a rolling bearing assembly in accordance with the present invention generally designated B. The assembly as illustrated comprises separate barrel rings 1, 2, 3 and 4. In the present instance, the rollers 5 are conical and accordingly, the rings have confronting complementary conical raceways. Each row of conical rollers as illustrated has its own cage 6. The bearing assembly shown in FIGS. 1 and 2 is a so-called O-configuration wherein the raceways are slanted radially inwardly toward each other. The outer rings 1 and 2 are prevented in a form-locking manner for moving axially outwardly in these designs by the conical rollers 5. To achieve this, an annular spacer member 7 is installed between the outer rings to fix these rings in their operating position. However, without a suitable means of connection, the corresponding inner rings 3 and 4 are able to move axially outwardly. Accordingly, they are connected to each other on the bore side to an annular fastening member 8 of U-shaped profile. The bore diameter D of the fastening member 8 is slightly larger than the bore diameter D1 of the inner barrel rings 3 and 4 which means that these rings can be pushed directly onto a suitable seating surface, not shown. To this end, recesses 8a and 8b are machined into the adjacent ends of the inner peripheral surfaces of the rings 3 and 4.

In accordance with the embodiment illustrated in FIG. 1, the spacer 7 has a rectangular profile and rests essentially against the axial end faces 1a and 2a of the outer barrel rings 1 and 2. The radially form-locking fixing is accomplished by means of a plurality of pins 9 distributed about the periphery, which are press fitted in axial through holes in spacer 7 and extend axially beyond the through holes so that their lateral surfaces 10 rest against the edge area of the raceways of the outer two rings 1 and 2.

In accordance with the roller bearing assembly illustrated in FIG. 2, the spacer has an inverted T-shaped profile wherein the axially directed legs of the T or profile sections 11 function to radially fix the barrel rings 1 and 2.

Figure 3:
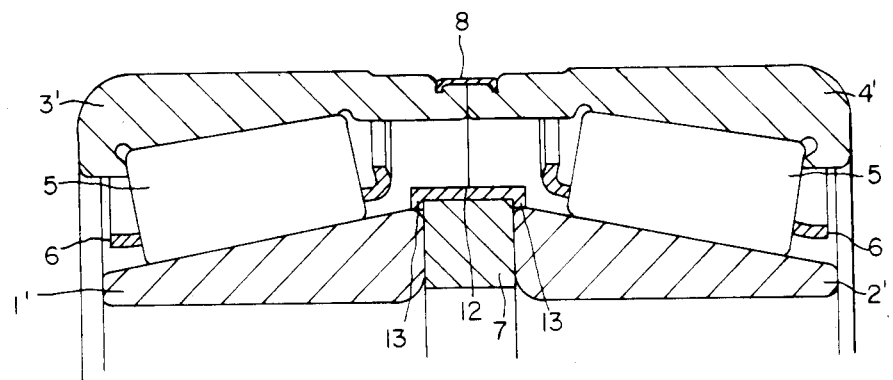
FIG. 3 is a partial. longitudinal sectional view through a double-row roller bearing assembly of X-configuration utilizing a rectangular profile spacer member and a sleeve on its lateral surface.

The roller bearing assemby shown in FIG. 3 has an X-configuration by reason of the fact that the raceways are slanted radially outwardly with respect to each other. In this configuration, the possible axial displacements of rings 1', 2', 3' and 4' are reversed with respect to the axial displacement of the rings in the bearing arrangements shown in FIGS. 1 and 2. For this reason the effective positions of spacer 7 and fastening member are also reversed. Thus, in the present embodiment, the fastening member 8 functions to connect the outer rings 3' and 4', whereas the spacer 7 is located between the confronting axial end faces of the inner rings 1' and 2'. Spacer 7 has a rectangular profile and carries on its lateral surface a sheet metal sleeve 12 with flanged edges 13, which function to limit radial displacement of the inner rings relative to one another.

The spacer 7 described herein are prefabricated in the form shown and are guided during assembly between the associated barrel rings 1 and 2. Then the two rows of rollers 5 are inserted and the additional barrel rings 3 and 4, which are not yet joined, are added axially from the two ends. The installation of fastening member 8 forms the final step of the assembly operation.

The elements of the bearing assembly of the present invention described above are easy and economical to fabricate and they are relatively simple to put together to form a completely integrated bearing assembly unit.

Even though particular embodiments of the present invention have been illustrated and described herein, it is not intended to limit the invention and changes and modifications may be made therein within the scope of the following claims. For example, the fastening member 8 may be one utilizing elastic projections and conical contact ramps to simplify assembly.

SUMMARY OF THE INVENTION

In a double-row roller bearing unit consisting of separate individual barrel rings 1, 2, 3, and 4, the barrel rings 1 and 2 without freedom of outward axial movement are fixed in place by means of a spacer member 7, whereas the barrel rings 3 and 4 with freedom of outward axial movement are connected by means of a fastening member 8. Neither the spacer member 7 nor the fastening member 8 extends radially beyond the area of the seating surfaces. In this way a unit is obtained which consists of only a few parts and which does not fall apart.

What is claimed is:

1. Roller bearing assembly comprising a pair of inner ring members and a pair of outer ring members, radially spaced to define bearing spaces therebetween, the rings of each pair having peripherally extending confronting surfaces faced radially toward said bearing spaces, a fastening member connecting one pair of said rings, at least one rigid spacer element disposed between axial end faces of the other pair of rings, and roller elements preventing axially outward movement of said other pair of rings, said spacer having axial projections cooperatively confronting and engaging one pair of said confronting surfaces of said one pair of rings to provide a positive form locking connection in the radial direction, said fastening member and spacer being disposed radially within the inner and outer peripheral surfaces of said bearing assembly.

2. Roller bearing assembly according to claim 1, characterized in that the spacer is designed as a single piece and has a T-shaped profile with profile sections extending on both sides into the bearing spaces.

3. Roller bearing assembly according to claim 1, characterized in that the spacer has a rectangular profile and is provided with at least three axial holes distributed around the periphery with pins inserted therein, which project on both sides into the bearing spaces.

4. Roller bearing assembly according to claim 1, characterized in that the spacer has a rectangular profile and a sleeve frictionally connected to said spacer, edges of said sleeve extending axially on both sides of said spacer into the bearing spaces.

5. Roller bearing assembly according to claim 4, characterized in that the edges of the sleeve are bent over like flanges to rest against end surfaces of the spacer ring.

* * * * *